United States Patent
O'Neal et al.

(10) Patent No.: US 6,728,357 B2
(45) Date of Patent: Apr. 27, 2004

(54) CENTRALIZED COMMUNICATION CONTROL CENTER AND METHODS THEREFOR

(75) Inventors: Stephen C. O'Neal, San Francisco, CA (US); John Jiang, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 09/907,051

(22) Filed: Jul. 17, 2001

(65) Prior Publication Data

US 2002/0110231 A1 Aug. 15, 2002

Related U.S. Application Data (63) Continuation of application No. 09/239,585, filed on Jan. 29, 1999, now Pat. No. 6,263,064.

(51) Int. Cl.[7] .................................................. H04M 3/42
(52) U.S. Cl. ............................... 379/201.04; 379/88.16; 379/88.13; 379/211.03
(58) Field of Search .......................... 379/88.12–88.17, 379/88.22–88.28, 90.01, 201.01, 201.02, 201.04, 201.12, 211.01–211.03, 212.01, 230, 213.01, 214.01, 217.01, 209.01, 210.01; 370/351–354

(56) References Cited

U.S. PATENT DOCUMENTS

| | | |
|---|---|---|
| 4,837,798 A | 6/1989 | Cohen et al. |
| 5,113,430 A | 5/1992 | Richardson, Jr. et al. |
| 5,127,003 A | 6/1992 | Doll, Jr. et al. |
| 5,128,871 A | 7/1992 | Schmitz |
| 5,136,634 A | 8/1992 | Rae et al. |
| 5,146,488 A | 9/1992 | Okada et al. |
| 5,243,645 A | 9/1993 | Bissell et al. |
| 5,333,266 A | 7/1994 | Boaz et al. |

(List continued on next page.)

*Primary Examiner*—Roland G. Foster
(74) *Attorney, Agent, or Firm*—Senniger, Powers, Leavitt & Roedel (57) ABSTRACT

A computer-implemented control center for permitting a subscriber of a plurality of communication services of a unified mess aging system to customize communication options pertaining to the plurality of communication services. The communication options include parameters associated with individual ones of the plurality of the communication services and routings among the plurality of communication services. The plurality of communication services comprise a voice telephone service through a telephony-centric network and an e-mail service through a data-centric network. The communication options are accessible via display terminals coupled to the data-centric network and via telephones coupled to the telephony-centric network.

18 Claims, 6 Drawing Sheets

U.S. PATENT DOCUMENTS

| | | |
|---|---|---|
| 5,351,276 A | 9/1994 | Doll, Jr. et al. |
| 5,353,336 A | 10/1994 | Hou et al. |
| 5,392,342 A | 2/1995 | Rosenthal |
| 5,430,791 A | 7/1995 | Feit et al. |
| 5,461,488 A | 10/1995 | Witek |
| 5,475,738 A | 12/1995 | Penzias |
| 5,479,411 A | 12/1995 | Klein |
| 5,487,103 A | 1/1996 | Richardson, Jr. et al. |
| 5,497,373 A | 3/1996 | Hulen et al. |
| 5,530,740 A | 6/1996 | Irribarren et al. |
| 5,537,401 A | 7/1996 | Tadamura et al. |
| 5,608,786 A | 3/1997 | Gordon |
| 5,610,910 A | 3/1997 | Focsaneanu et al. |
| 5,633,916 A | 5/1997 | Goldhagen et al. |
| 5,646,981 A | 7/1997 | Klein |
| 5,652,785 A | 7/1997 | Richardson, Jr. et al. |
| 5,675,507 A | 10/1997 | Bobo, II |
| 5,729,599 A | 3/1998 | Plomondon et al. |
| 5,732,126 A | 3/1998 | Fitzpatrick et al. |
| 5,737,395 A | 4/1998 | Irribarren |
| 5,740,230 A | 4/1998 | Vaudreuil |
| 5,740,231 A | 4/1998 | Cohn et al. |
| 5,742,905 A | 4/1998 | Pepe et al. |
| 5,751,792 A | 5/1998 | Chau et al. |
| 5,781,614 A | 7/1998 | Brunson |
| 5,793,762 A | 8/1998 | Penners et al. |
| 5,794,039 A | 8/1998 | Guck |
| 5,796,394 A | 8/1998 | Wicks et al. |
| 5,799,063 A | 8/1998 | Krane |
| 5,812,795 A | 9/1998 | Horovitz et al. |
| 5,822,405 A | 10/1998 | Astarabadi |
| 5,825,854 A | 10/1998 | Larson et al. |
| 5,844,969 A | 12/1998 | Goldman et al. |
| 5,848,415 A | 12/1998 | Guck |
| 5,859,898 A | 1/1999 | Checco |
| 5,870,454 A | 2/1999 | Dahlen |
| 5,872,779 A | 2/1999 | Vaudreuil |
| 5,872,926 A | 2/1999 | Levac et al. |
| 5,878,117 A | 3/1999 | Minakami et al. |
| 5,884,262 A | 3/1999 | Wise et al. |
| 5,892,764 A | 4/1999 | Riemann et al. |
| 5,915,008 A | 6/1999 | Dulman |
| 5,958,016 A | 9/1999 | Chang et al. |
| 6,061,432 A | 5/2000 | Wallace et al. |
| 6,069,890 A | 5/2000 | White et al. |
| 6,075,783 A | 6/2000 | Voit |
| 6,263,064 B1 * | 7/2001 | O'Neal et al. ......... 379/201.03 |

* cited by examiner

CENTRALIZED COMMUNICATION CONTROL CENTER AND METHODS THEREFOR

CROSS REFERENCE TO RELATED APPLICATIONS

The present application is a continuation of U.S. patent application Ser. No. 09/239,585, filed on Jan. 29, 1999, now U.S. Pat. No. 6,263,064.

application Ser. No. 09/239,560, filed Jan. 29, 1999, entitled "INTEGRATED MESSAGE STORAGE AND RETRIEVAL SYSTEM DISTRIBUTED OVER A LARGE GEOGRAPHICAL AREA";

U.S. Pat. No. 6,411,695, issued Jun. 25, 2002, entitled "A SYSTEM AND METHOD FOR PROVIDING UNIFIED MESSAGING TO A USER WITH A THIN WEB BROWSER";

U.S. Pat. No. 6,463,145, issued Oct. 8, 2002, entitled "COMPUTER-IMPLEMENTED CALL FORWARDING OPTIONS AND METHODS THEREFOR IN A UNIFIED MESSAGING SYSTEM";

application Ser. No. 09/240,893, filed Jan. 29, 1999, entitled "INTERACTIVE BILLING SYSTEM UTILIZING A THIN WEB CLIENT INTERFACE";

application Ser. No. 09/240,368, filed Jan. 29, 1999, entitled "A SYSTEM AND METHOD TO MANAGE PHONE SOURCED MESSAGES";

application Ser. No. 09/240,434, filed Jan. 29, 1999, entitled "METHOD AND APPARATUS FOR NETWORK INDEPENDENT INITIATION OF TELEPHONY";

application Ser. No. 09/240,435, filed Jan. 29, 1999, entitled "APPARATUS AND METHOD FOR DEVICE INDEPENDENT MESSAGING NOTIFICATION";

application Ser. No. 09/240,436, filed Jan. 29, 1999, entitled "APPARATUS AND METHOD FOR CHANNEL-TRANSPARENT MULTIMEDIA BROADCAST MESSAGING";

application Ser. No. 09/239,589, filed Jan. 29, 1999, entitled "VOICE ACCESS THROUGH A DATA-CENTRIC NETWORK TO AN INTEGRATED MESSAGE STORAGE AND RETRIEVAL SYSTEM".

BACKGROUND OF THE INVENTION

The present invention relates to communication services available via a data-centric network (i.e., a network that carries digital data) and a telephony-centric network (i.e., a network that carries telephony information such as voice, fax, pager, and the like). More particularly, the present invention relates to a centralized facility and methods therefor that allow a subscriber of various communication services to review and customize his communication options, in an interactive and simplified manner, via either the data-centric network or the telephony-centric network.

Both the data-centric network (e.g., a distributed computer network) and the telephony-centric network (e.g., public telephone network) have existed for some time. Broadly speaking, the data-centric network (such as the Internet) may be thought of as a global computer network that connects millions of computer terminals all over the world in such a way that digitized information can be exchanged irrespective of the different hardware and software platforms that may be utilized to gain access to the data-centric network. People and businesses around the world use the data-centric network to retrieve information, communicate and conduct business globally, and access a vast array of services and resources on-line. In a similar manner, the telephony-centric network (whether wired or wireless) may also be thought of as another global network that connects the millions of telephony devices (such as voice-oriented telephones, pagers, facsimile machines, voice mail boxes, and the like) together in such a way that a user at one of the telephony devices can readily transmit information to other telephony devices irrespective of geographic boundaries.

In the past, these two networks existed as separate domains. This is because the widely accessible data-centric network is a fairly recent phenomenon. For decades, the only network that has been available to the masses is the analog telephony-centric network, starting with the telegraph network of the nineteenth century. However, as more and more of the services traditionally offered through the telephony-centric network are being offered in a digital format by the data-centric network, the distinction between the data-centric network and the telephony-centric network begins to blur. Irrespective of whether these two networks exist as separate networks physically or conceptually going forward, the legacies of their separate existence can be seen in the various different communication services and communication devices that currently exist.

By way of example, there exist many different communication devices and services available today to allow a person to communicate to another person, e.g., telephones, facsimile machines, electronic mail (e-mail), pagers, voice mail, and the like. Generally speaking, a telephone is a communication device employed to transmit and receive speech and other sounds. A facsimile machine is a communication device to transmit and receive graphical data. A pager is a highly portable device that allows its user to receive data, and in some cases transmit limited data to a pager service provider. A voice mail box is essentially a service that allows one person to temporarily store telephone messages for retrieval by another. E-mail services allow e-mail users to transmit and receive data from computer terminals connected to the data-centric network. All these devices and services are well known in the art and will not be elaborated further for the sake of brevity.

Currently, these communication services are viewed, both by the service providers who create and maintain the network infrastructure and the subscribers who employ the devices and networks for communication, as separate services. This is due, partly but not entirely, to past government deregulation efforts and gradual technological evolution that have given rise to different service providers, all competing to provide the communication services to individual consumers. Thus, it is not unusual for a consumer to have an e-mail account with one service provider, a telephone account with another service provider and a pager account with yet another service provider. Even if the different services are contracted through a single service provider, the dual existence of the data-centric network and the telephony-centric network, as well as existing billing and account management infrastructures, often force the service provider to manage each of these services as a separate account.

One of the consequences of having different accounts for different services is the proliferation of telephone numbers, facsimile numbers, and pager numbers that a typical consumer must deal with. Thus, it is not at all unusual for a consumer to have a home telephone number, a work telephone number, one or more cellular telephone numbers, a pager number, and a facsimile number, with each of these numbers being assigned to a different communication device. Not only are these various numbers difficult to remember for the consumer, they are confusing to others.

A more serious consequence is the burden on the consumer who needs to manage the communication options associated with the different services (which are now assigned to different physical devices and managed as different accounts) to ensure that incoming and outgoing messages are properly handled. By way of example, a person who travels may wish to forward voice calls made to his home and office telephone numbers to his cellular telephone or hotel telephone. Likewise, he may wish to divert facsimiles sent to his office facsimile machine to a facsimile machine that is more local. While in a meeting, however, he may wish to temporarily divert the voice calls to his voice mail box or forward it to another person for handling. To stay in touch, these communication options may need to be changed many times during the course of the day and/or each time he arrives at a new location.

To accomplish the above, the person in the above example currently needs to first ascertain the current communication option settings associated with the various services that he uses. Unless he is diligent in noting and/or remembering the recent changes in the communication option settings, he may need to call each of the service providers to find out what the current communication option settings are. Assuming that he knows the current communication option settings and such calls need not be made, the user must still access each communication device and/or contact each service provider to reroute the incoming and outgoing messages.

By way of example, some facsimile machines currently allow the user to forward the incoming facsimile to another facsimile machine by entering a particular combination of the forwarding number and predefined codes on the facsimile machine keypad. Likewise, many telephone systems require the user to physically enter the forwarding telephone number and predefined codes on the keypad of the telephone from which forwarding originates. However, this requires the user to be physically present at the facsimile machine or telephone from which forwarding originates. If he owns one of these telephones or facsimile machines and is on the road, such forwarding would not be possible absent help from another person who has such physical access.

The fact that each communication service is treated as a different account also requires the user in the example above to access each account and/or service provider to accomplish the changes. Thus, multiple calls may need to be made to change the communication option settings associated with the different communication services. Even with automated response systems in place to handle such changes, these calls take time and can aggravate even the most patient users, especially if multiple calls need to be made to the multiple service providers each time he moves from one location to another. As can be appreciated by those skilled in the art, such approach is at best time consuming and unwieldy.

More typically, a busy user would just not bother changing the communication options associated with the various communication devices that he owns. He would rather suffer the possibility of missing out on some messages than constantly contacting the different service providers and making changes on individual services. In this case, the communication services that he owns are not employed to their fullest potential.

In view of the forgoing there are desired improved techniques for allowing a user of communication services to review and customize the communication options associated with these services in a simplified and convenient manner.

SUMMARY OF THE INVENTION

The invention relates, in one embodiment, to a computer-implemented control center for permitting a subscriber of a plurality of communication services of a unified messaging system to customize communication options pertaining to the plurality of communication services. The communication options include parameters associated with individual ones of the plurality of the communication services and routings among the plurality of communication services. The plurality of communication services comprising a voice telephone service through a telephony-centric network and an e-mail service through a data-centric network. The communication options is accessible via display terminals coupled to the data-centric network and via telephones coupled to the telephony-centric network. The computer-implemented control center includes a subscriber communication profile database. The subscriber communication profile database has therein an account pertaining to the subscriber. The account includes the communication options for the subscriber.

There is also included a computer server coupled to exchange data with the subscriber communication profile database. The computer server is configured to visually display the communication options on one of the display terminals when the subscriber employs the one of the display terminals to access the computer-implemented control center. The computer server also is configured to receive from the subscriber via the one of the display terminals a first change to the communication options and to update the first change to the account in the subscriber communication profile database.

There is further included a telephony server coupled to exchange data with the communication profile database. The telephony server is configured to audibly represent the communication options to one of the telephones when the subscriber employs the one of the telephones to access the computer-implemented control center. The telephony server also is configured to receive from the subscriber via the one of the telephones a second change to the communication options and to update the second change to the account in the subscriber communication profile database.

The invention relates, in another embodiment, to a computer-implemented method for permitting a subscriber of a plurality of communication services of a unified messaging system to customize communication options pertaining to the plurality of communication services. The communication options include parameters associated with individual ones of the plurality of the communication services and routings among the plurality of communication services. The plurality of communication services includes a voice telephone service through a telephony-centric network and an e-mail service through a data-centric network. The communication options are accessible via display terminals coupled to the data-centric network and via telephones coupled to the telephony-centric network. The method includes providing a subscriber communication profile database. The subscriber communication profile database has therein an account pertaining to the subscriber. The account includes the communication options for the subscriber.

There is also included visually displaying the communication options on one of the display terminals, using a computer server coupled to exchange data with the subscriber communication profile database, when the subscriber employs the one of the display terminals to access the computer-implemented control center. There is further included receiving from the subscriber via the one of the display terminals at the computer server a first change to the communication options. The first change to the communication options pertains to either the voice telephone service or the e-mail service. Additionally, there is included updating the first change to the account in the subscriber communication profile database, thereby resulting in a first updated subscriber communication profile database, wherein subsequent messages to the subscriber at the unified messaging system, including the voice telephone service, are handled in accordance with the first updated subscriber communication profile database.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

The present invention will now be described in detail with reference to a few preferred embodiments thereof and as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with one aspect of the present invention, there is provided a computer-implemented control center which is coupled to the data-centric network and the telephony-centric network, and which allows a user to access, using either a telephone or a computer, the communication options associated with the various communication services of a unified messaging service. Unlike the prior art approach which requires the user to contact individual service providers/accounts and/or to access individual communication devices to review and change the communication options associated therewith, the computer-implemented control center allows the communication options associated with the various communication services to be accessed substantially all at once. That is, the computer-implemented control center provides a single central facility through which the communication option settings associated with the different communication services may be reviewed and/or modified.

In accordance with one aspect of the present invention, the communication options, which include the options associated with individual communication services as well as routings among the different individual communication services, are accessible using either a computer network interface (e.g., a web page) or a telephone network interface (e.g., via a telephone). The communication option settings themselves do not reside with individual communication devices or require access through a particular communication device (such as with the assigned facsimile machines or telephones discussed earlier). Rather, the communication option settings are centralized within the universally accessible computer-implemented control center and can be utilized to properly control the communication options associated with the various services and to facilitate control of the routings therebetween. More importantly, they can be reviewed and modified by a properly authenticated subscriber of the unified messaging service through any suitable computer or telephone irrespective of the geographic location from which the accessing and/or modifications are made.

In the aforementioned co-pending patent applications entitled "INTEGRATED MESSAGE STORAGE AND RETRIEVAL SYSTEM DISTRIBUTED OVER A LARGE GEOGRAPHICAL AREA" (application Ser. No. 09/239, 560, filed Jan. 29, 1999), and "A SYSTEM AND METHOD FOR PROVIDING UNIFIED MESSAGING TO A USER WITH A THIN WEB BROWSER" (U.S. Pat. No. 6,411,685, issued Jun. 25, 2002), which are all incorporated herein by reference, some inventive unified messaging services and their various features are disclosed. Although the present invention may be implemented on any unified messaging system, reference may be made to the above-mentioned co-pending patent applications for details pertaining to preferable unified messaging systems on which the present invention may be implemented.

In general terms, a unified messaging system benefits a user by integrating various communication services, which up to now have existed as separate services. The integration facilitates simplified management, billing, and more importantly the routing of messages among the various services. With a unified messaging service, a user may, for example, specify that an incoming facsimile be forwarded to a computer for viewing or to a printer for printing, listen to e-mail messages through a telephone, receive pager notification when a facsimile is received, or the like. Within limits, a unified messaging system allows messages to be received, stored, retrieved, and/or forwarded (in the original format or in a different/abbreviated format) without regard to the communication devices and/or networks (i.e., data-centric vs. telephony-centric) employed for the transmission of the messages.

A unified messaging system implemented on a data-centric network takes the unified messaging system concept a step further by internally storing and manipulating the messages in a digital format irrespective of whether the message was received and/or will be sent in the digital or analog format. As is well known, digital formatting increases the flexibility with which information contained in the messages can be analyzed, stored, manipulated, and/or routed among the various communication devices. More importantly, the implementation of the unified messaging system on a data-centric network permits the subscriber to access his account through any computer or telephone irrespective of the geographic location from which the accessing and/or modifications are made.

Figure 1:
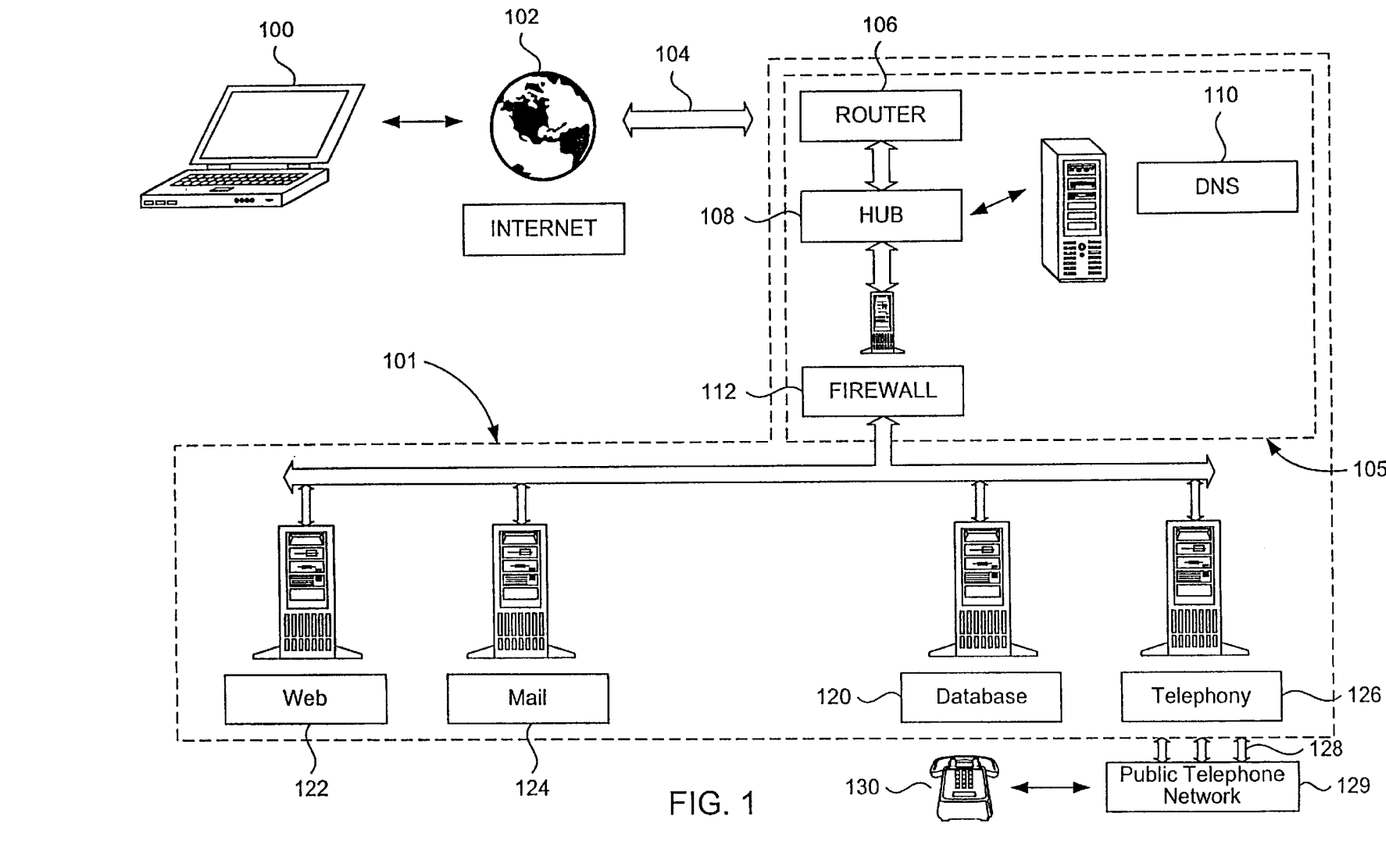
FIG. 1 depicts, in one embodiment, the general overview of the unified message system.

To facilitate discussion, FIG. 1 depicts, in accordance with one embodiment of the present invention, the general overview of a unified message system 101. With reference to FIG. 1, there is shown a user computer 100, representing a computer that may be employed to access and/or modify the communication options associated with the communication services offered by the unified messaging system. Although user computer 100 is shown to be a desktop personal computer (such as an Intel-based personal computer), user computer 100 may in fact represent any computing device capable of accessing the data-centric network (represented by reference 102 in FIG. 1). By way of example, user computer 100 may represent a laptop computer, which may access the data-centric network either through wired connections or in a wireless manner. As another example, user computer 100 may represent a personal digital assistant (PDA) or a palm-top computer, or a thin-client type computer.

Data-centric network 102 may represent any computer network which couples together users from geographically dispersed locations. In a preferred embodiment, data-centric network 102 represents the Internet, although data-centric network 102 may also represent a Wide Area Network (WAN), a Local Area Network (LAN), a Virtual Private Network (VPN) or any similarly suitable networking arrangement that allows users to log in from a remote terminal.

With reference to FIG. 1, there is shown data link 104, representing the high speed data lines for transmitting and receiving data between unified messaging system 101 and data-centric network 102. In a preferred embodiment, data link 104 is implemented by high speed T1 data lines, although other types of data lines such as fiber optics may also be employed. A network interface system 105 couples data link 104 to the remainder of unified messaging system 101, which is shown to include four servers as shown (the servers are discussed later herein).

Network interface system 105 represents the interface system that ensures data is properly transmitted and received between unified messaging system 101 and data-centric network 102. Of course network interface system 105 may vary depending on the implementations of the data-centric network and/or the portion of unified messaging system 101 to which network interface system 105 is coupled.

In the case of the Internet, one current preferred implementation of network interface system 105 may include a router 106, a hub 108, a DNS (Domain Name System) facility 110, and a firewall 112. Typically, the router 106 is a piece of hardware or software that examines the IP address of data packets and determines the routing of the data packets based on the IP address.

Router 106 acts cooperatively with hub 108 and DNS facility 110 to permit properly addressed data packets to be received through firewall 112. Router 106, hub 108, DNS facility 110, and firewall 112 are conventional and will not be belabored here for the sake of brevity.

At the heart of the unified message system are a set of servers which are coupled to exchange data and are connected to firewall 112 and the public telephone network. Typically, a server represents a computer that processes data for use by other data-consumer devices (such as other servers, computers or any of the communication devices through a proper interface circuit). There is shown a database server 120, which is employed to, among other tasks, organize and maintain the subscriber communication profile database. The subscriber communication profile database itself may reside with database server 120 and represents a data store of subscriber accounts and communication option settings associated therewith. Incoming messages to a particular subscriber or outgoing messages from that subscriber are formatted and routed in accordance with the communication option settings stored in the subscriber communication profile database. Properly authorized changes to the communication option settings will be reflected in the communication option settings stored in the subscriber communication profile database and employed to handle subsequent messages (whether incoming or outgoing).

Subscriber authentication data may be employed to access to a subscriber communication profile database. Subscriber authentication data may be stored in the database server. Subscriber authentication may be accomplished using several techniques. For example, a numeric password, an alphanumeric password, a hidden code wherein the password is randomly hidden in a string (i.e., xxxppppxx, xppppxxxx, etc.) and biometrics (e.g., retina scans, hand prints, palm prints, finger prints, voice recognition, etc.).

A web server 122 is employed to facilitate interaction between unified messaging system 101 and data-centric network 102. Web server 122 represents one of the system-side servers (i.e., a server that handles the exchange of data with the user's computer via the data-centric network) and is employed, for example, to present to user computer 100 the log-in screen when a subscriber employs user computer 100 to access the unified messaging service. Once that subscriber is properly authenticated (e.g., through a password procedure or another suitable authentication procedure), web server 122 then communicates with database server 120 to obtain the current communication option settings for that subscriber and to display the current communication option settings and an individualized web page to the subscriber for review.

In one preferred embodiment, web server 122 is employed to store all messages pertaining to a particular subscriber. The messages are stored as files in web server 122. These messages may represent, for example, voice files, facsimiles, e-mail messages, voice mail messages, or the like. Pointers in database server 120 facilitate access to the stored messages in web server 122. However, it is contemplated that the messages may be stored in any of the servers discussed herein and/or in a separate storage device accessible by the servers.

An e-mail server 124 is employed to process incoming and outgoing e-mail messages. By way of example, e-mail server 124 may be employed to format/translate the e-mail messages so that they can be properly transmitted to other e-mail systems and understood thereat. For incoming messages, e-mail server 124 may be employed to format/translate the information transmitted via the incoming e-mail and to prepare them for use by other data consumers.

Figure 2:
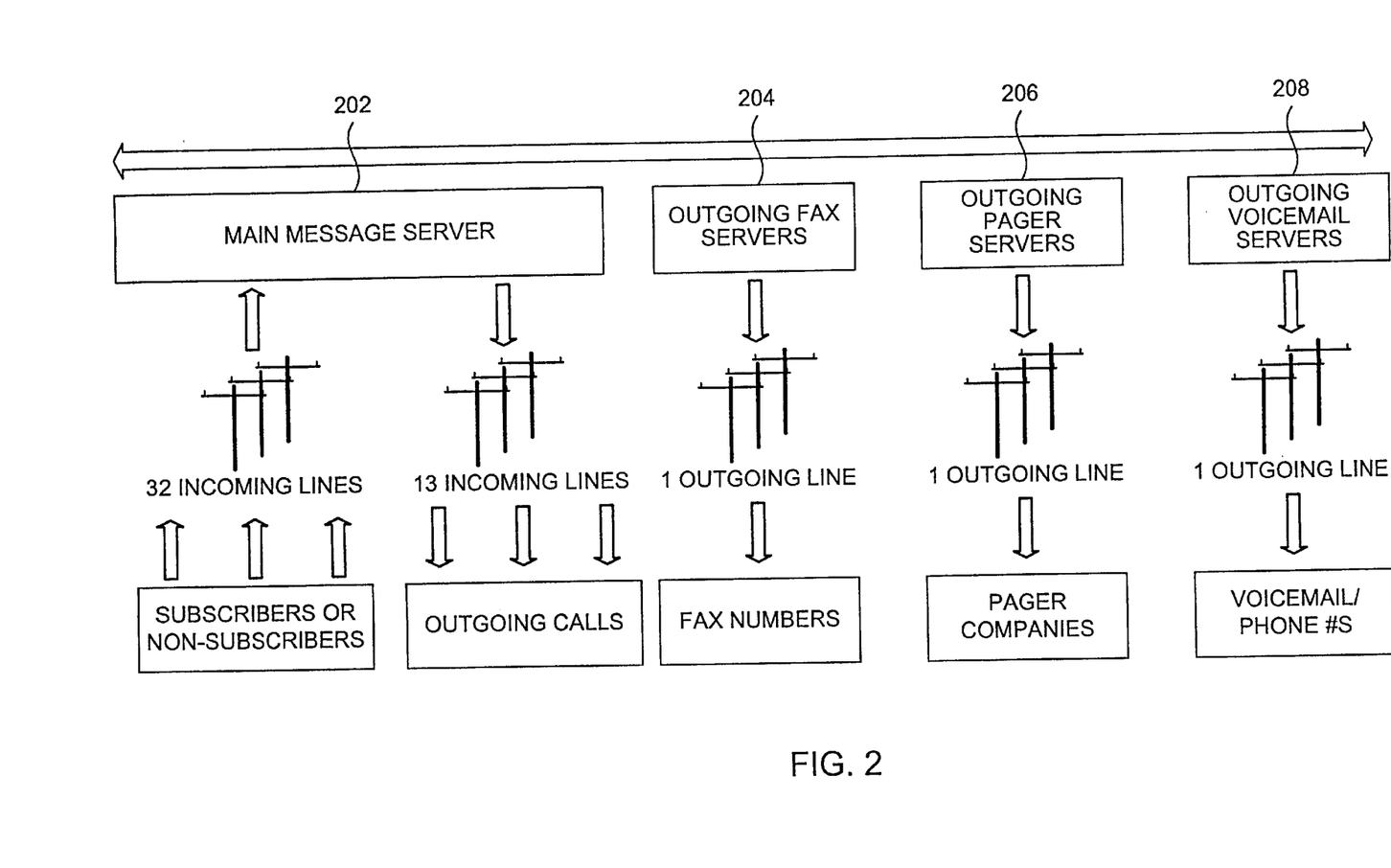
FIG. 2 illustrates, in one embodiment, how the 48 telephone lines provided per T1 link may be divided among the sub-servers of the telephony server.

A telephony server 126 is shown coupled between telephone link 128 and the remainder of the unified messaging system and may include any number of sub-servers, such as are shown in FIG. 2. In a manner analogous to web server 122, telephony server 126 represents a systemt-side server (i.e., a telephony server that handles the exchange of information with the user via the telephony-centric network) and is employed to facilitate interaction between unified messaging system 101 and telephony-centric network 129. Telephony server 126 may be employed to, for example, translate the telephone signals (such as the dialed digits) into a digital format for the purpose of authenticating and allowing subscriber access. Telephony server 126 may also be employed to translate such dialed digits and/or other telephone signals (such as a facsimile tones or verbal commands) into digital data, which may then be employed to facilitate handling of messages and/or the communication option settings. In one embodiment, Dialogic board models D 240 SC-T1, D 480 SC-1, CP-4 /SC, CP-6/SC, and/or CP-12/SC (available from Dialogic Corporation of Parsippany, N.J.) are employed to facilitate the translation between telephone signals and digital data. Once translation is performed, software within telephony server 126 employs the digital data to decide how to handle the message using the communication option settings obtained from the subscriber communication profile database. If the subscriber, through predefined dialing sequences, indicates that he wishes to review and/or modify the communication option settings, software within telephony server 126 operates cooperatively with database server 120 to affect the change to the communication option settings. Once the communication option settings are reflected in the subscriber communication profile database stored in database server 120, the new communication option settings are consulted each time a message needs to be handled by the unified messaging system.

Telephony-centric network 129 represents any telephone network which couples together telephony-type communication devices (e.g., facsimile machines, pagers, telephones) from geographically dispersed locations. By way of example, telephony-centric network 129 may represent a plain old telephone system (POTS), a wired telephone network popularly known as Public Service Telephone Network (PSTN) or a cellular network or a combination thereof. Telephony-centric network 129 is well known and will not be discussed in great detail here for the sake of brevity.

A telephone 130 is shown coupled to telephony-centric network 129. In reality, it should be understood that a wide variety of telephony devices (which are not shown to simplify the illustration) are connected to telephony-centric network 129. Some of these exemplary communication devices are, as mentioned, facsimile machines, pagers, cellular telephone sets, wired telephone sets, and the like.

Telephone link 128 represents the telephone communication channels for transmitting and receiving telephone signals between unified messaging system 101 and telephony-centric network 129. In a preferred embodiment, telephone link 128 represents high bandwidth T1 telephone links, although other types of telephone links may also be employed. Note that there is no requirement that the data transmitted on telephone link 128 be analog. In fact, with the upcoming convergence of data networks and telephone networks, the telephony information that traverses telephone link 128 may well be digital (in which case, telephony server 116 will be adapted to handle digital telephony signals instead of analog telephony signals). As a noteworthy point, it is expected that as data networks and telephone networks converge, the relevant functionality represented by the servers herein may still apply, albeit with the proper modification to handle an all-digital combined data/telephone network.

FIG. 2 illustrates, in accordance with one embodiment of the present invention, how the 48 telephone lines provided per T1 link may be divided among the sub-servers of telephony server 126. As shown in FIG. 2, 45 of the telephone lines may be employed by a main message server 202 to handle the incoming/outgoing voice calls, the incoming voice mail messages, and the incoming facsimiles. Of the 45 telephone lines, 32 may be provisioned for the subscribing or non-subscribing users to dial into the unified messaging system, and the other 13 telephone lines may be employed to allow outgoing calls to be made from within the unified messaging system. The outgoing calls may, for example, be calls destined for the unified messaging system but are rerouted out of the unified messaging system in accordance with a subscriber's communication option setting or they may be originated by the subscriber, who dials into the unified messaging system (using a toll-free access number, for example) and requests an outgoing call be made therefrom to some destination number (for example by punching in the "#" key after authentication, followed by the destination number), thus employing the unified messaging system as a type of calling card service.

One of the 48 telephone lines of the T1 link may be reserved for outgoing facsimile transmission, which is handled by an outgoing facsimile server 204. Another telephone line may be apportioned for the outgoing paging service, which is handled by an outgoing pager server 206. Outgoing voice-mail messages are handled by voice mail server 208, which is coupled to another one of the 48 telephone lines of the T1 link as shown.

To elaborate, outgoing voicemails are voice messages sent to a voicemail phone number which may be created via the web or the telephone. Outgoing voicemails may be new voicemails, replies to other messages or forwarded as a voicemail. For example, when forwarding a voicemail via the web, the voicemail may be treated as an attachment to a speech synthesized text message with the recipient address as a telephone number. Outgoing voicemail servers may be geographically distributed and communicate with each other via internet in such a way that the server nearest the destination voicemail phone number may be assigned to send the voicemail via either a circuit-switched call or packet-switched call.

Outgoing facsimiles are facsimile messages sent to a facsimile telephone number which may be created via the web or the telephone. Outgoing facsimiles may be new facsimiles, replies to other messages, forwarded as a facsimile or call-forwarded as a facsimile in which the system stores the incoming facsimile and then forwards the facsimile to the subscriber's facsimile-forward number. For example, when forwarding a facsimile via the web, the facsimile may be treated as an attachment to Tiff conversion of a text message with the recipient address as a phone number. Like outgoing voicemail servers, outgoing facsimile servers may also be geographically distributed. Outgoing facsimile servers may communicate with each other via internet in such a way that the server nearest to the destination facsimile telephone number may be assigned to send the facsimile via either a circuit-switched call or packet-switched call.

Outgoing pages are paging messages sent to a pager number which may be created via the telephone either by the caller or by the system when sending notification. Like outgoing voicemail servers, outgoing page servers may also be geographically distributed. Outgoing page servers may communicate with each other via the internet in such a way that the server nearest to the destination pager telephone number may be assigned to send the page via either a circuit-switched call or packet-switched call.

There may also be outgoing emails and their servers that do not involve circuit switched calls. Some pagers may be alphanumerical type and can receive messages as an email. In this case, the outgoing pager server may delegate these requests to the outgoing email servers.

In one embodiment, messages sent to the unified messaging system may be stored in web server 122 with pointers to these messages being held in database server 120. The above mentioned set of sub-servers (outgoing facsimile server, outgoing pager server and outgoing voice mail server) are arranged to make requests to the database server for outgoing messages stored on the web server. If an outgoing message is detected by a sub-server, software within the sub-servers decides how to handle the outgoing message according to the communication option settings obtained from the subscriber communication profile database. Again, a Dialogic board may be employed, in one embodiment, to facilitate the translation between the stored data and the outgoing telephone signal.

All types of outgoing message requests (voicemail, facsimile, email, pages) are queued in the database server. These requests can also be associated with a delivery time (e.g., the default time is "now"). Each type of request may be stored in a separate queue. An outgoing server of a particular type of message periodically checks its queue from the database server to see if any request's time is up for delivery.

It should be noted that FIG. 2 shows only one exemplary way to divide the T1 telephone lines among the various sub-servers of telephony server 126. Depending on the traffic pattern generated by subscribing and non-subscribing users of the unified messaging system, these lines and sub-servers may be scaled as necessary.

Figure 3:
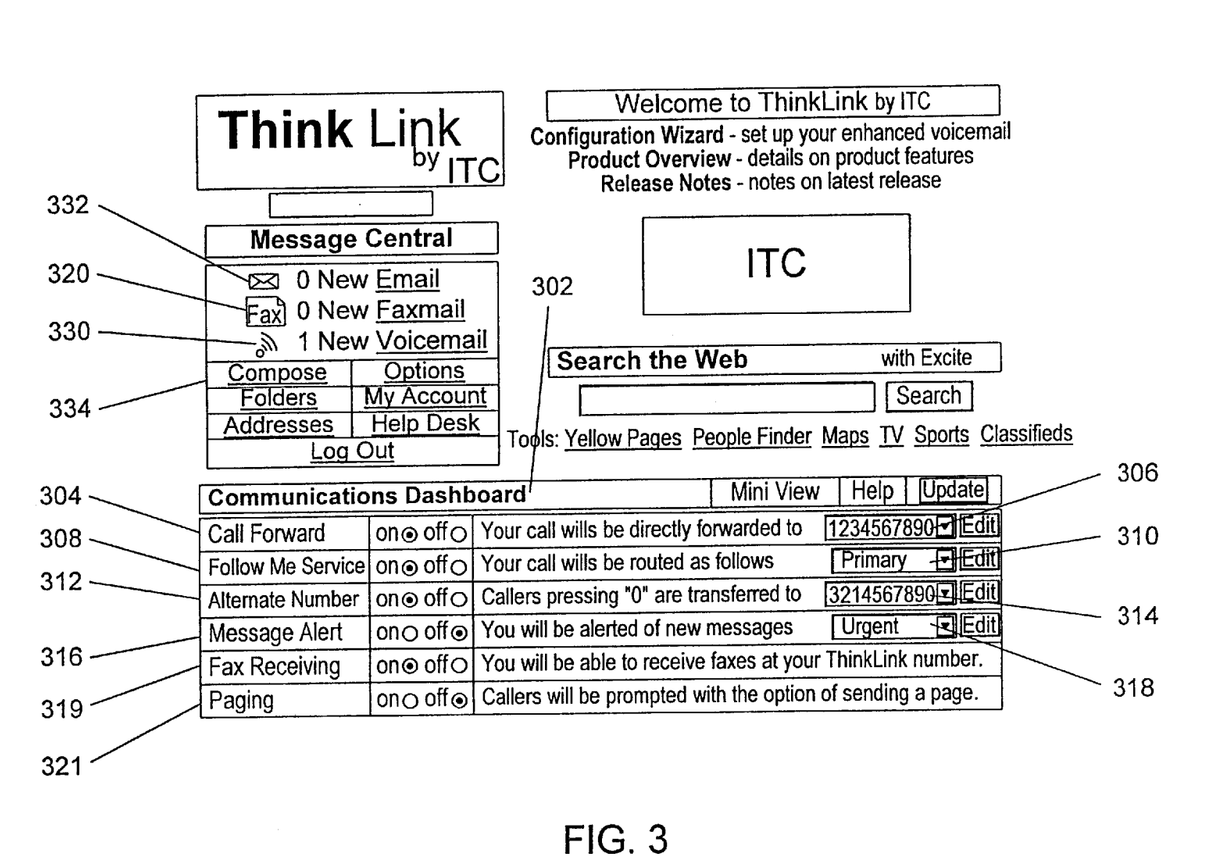
FIG. 3, in one embodiment, the user interface portion of the computer-implemented control center, representing the visual display panel for displaying the communication options pertaining to a particular subscriber on a computer display screen.
Figure 4:
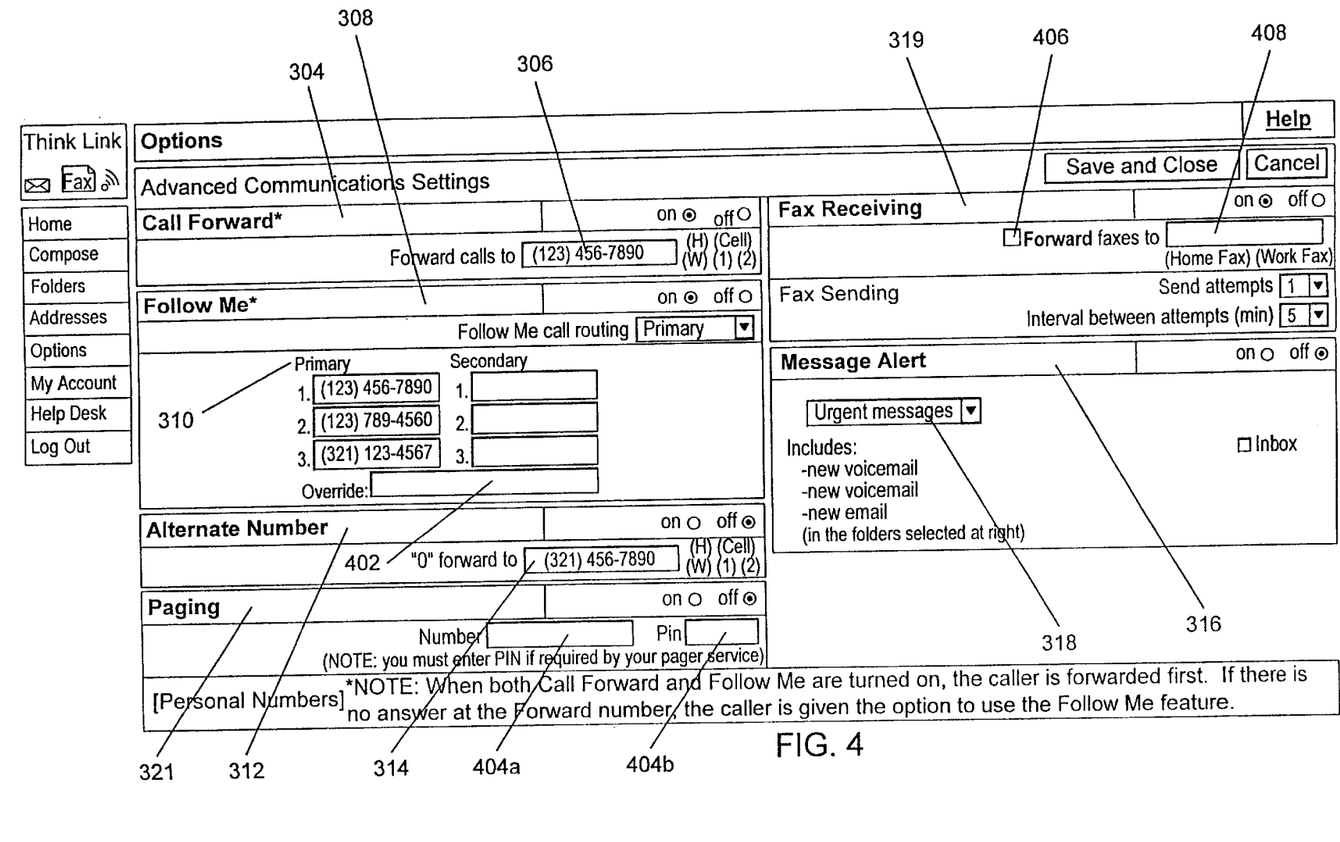
FIG. 4 shows the communication options in greater detail, in accordance with one embodiment of the present invention.

FIG. 3 illustrates, in accordance with one embodiment of the present invention, the user-interface for an exemplary computer-implemented control center, representing the visual display panel for displaying the communication options pertaining to a particular subscriber on a computer display screen. Through computer-implemented control center 302, the user may quickly and conveniently review the communication option settings associated with the various services and make changes thereto. That is, the computer-implemented control center 302 serves as the centralized control panel for reviewing and/or customizing the communication options associated with the various communication services. FIG. 4 illustrates aspects of computer-implemented control center 302 in greater detail.

In the exemplary implementation of FIG. 3, six representative communication options are shown. The call forwarding service 304, if it is enabled, allows incoming calls through telephony-centric network 129 to be routed to a provided forwarding number 306. The call forwarding option setting may also be seen in the detailed computer-implemented control center view of FIG. 4, which shows the communication options in greater detail.

To accomplish the forwarding, telephony server 126 consults, after a call is made to a subscriber's telephone number, the subscriber communication profile database in database server 120. If the call forwarding option is enabled, that call is then forwarded to the forwarding number specified by telephony server 126 via an outgoing telephone line. If the forwarding number does not pick up, the call may be rerouted, for example, to the subscriber's voice mail box. If the call forwarding option is not enabled and the caller does not choose other methods discussed below to try to contact the subscriber, the call may then be forwarded to the subscriber's voice mail box as well.

The "follow me" service 308 gives the subscriber the ability to designate a set of telephone numbers where he may likely be found and gives the caller the option to try to find the subscriber (or someone who may appropriately handle the incoming call) at those numbers. By way of example, during a work day, a given subscriber may be contacted either at his main office telephone, his secondary office telephone, or his cellular telephone in his car. On the weekend, that same subscriber may be found at home or at a cellular telephone in his boat. The office/car set of telephone numbers may be designated a primary set 310 and the home/boat set of telephone numbers may be designated a second set. FIG. 4 shows the communication options associated with the follow me service in greater detail.

On a week day, the subscriber may enable the follow me service option and select primary set 310 as the set of telephone numbers where he may likely be found. On the weekend, the subscriber may enable the follow me service option and select the secondary set, for example. From the caller's perspective, the follow me service is preferably an on-demand service. That is, the caller is preferably given the option to decide whether to employ the follow me service by pressing a predefined key in response to instructions or to simply allow the call to be passed to voice mail if unanswered.

If the follow me service is enabled by the subscriber and chosen by the caller, telephony server 126 will try to place outgoing calls to the numbers designated in the selected set starting with the first number in the set. To ensure that the call is not inadvertently completed vis-a-vis by a bystander who happens to be near the destination telephone and picks up the telephone when it rings, telephony server 126 may allow the caller to record his name. Telephony server 126 then announces the name to the person picking up the destination telephone prior to giving that person a choice of whether to accept the call. If the person who picks up the call is indeed the person for whom the call is intended, the entry of a predefined key press (on instructions by telephony server 126) on the destination telephone keypad will allow telephony server 126 to complete the end-to-end connection. In this manner, the follow me service may be employed as a call screening mechanism if desired. Telephony server 126 may try all the numbers in the set in sequence until the subscriber is found. If not, the call may be allowed to pass into the subscriber's voice mail box.

In one embodiment, the follow-me service may not always use the same sequence to callout a subscriber when the subscriber has set up several numbers as his possible locations (e.g., weekday routine or weekend and evening routine). The follow-me service may use the number where the subscriber is last located (stored in memory) as the first number to dial in the sequence provided the time for the last location happened within a certain interval (e.g., an hour).

An alternate number service 312 gives the subscriber the ability to designate a telephone number as an alternate number where the caller can attempt to locate the subscriber (or someone who may appropriately handle the incoming call) at a number designated in advance (314). FIG. 4 shows the communication options associated with the alternate number service in greater detail. The alternate number option is similar to call forwarding with the exception that the alternate number option is an on-demand service. That is, the caller is preferably given the option to decide whether to employ the alternate number service by pressing a predefined key in response to instructions or to simply allow the call to be passed to voice-mail if unanswered. In all other respects, the alternate number service may function in the same way as the call forwarding service. An alternate number may also be used to set a personal operator number (e.g., your secretary).

A message alert option 316 gives the subscriber the ability to select whether to be alerted when a message is received. The message that triggers the alert may be specified using any number of filtering criteria stored as part of the subscriber communication option settings. In the example of FIG. 3, the filtering criteria is "urgent" (318) although any type of filtering may be applied. For example, the filtering criteria could be the message's sender, subject or content. The sender could be identified by his email address or phone number (e.g., caller ID).

FIG. 4 shows, in one embodiment, the communication option settings associated with the unified messaging service in greater detail. With respect to the message alert service, the alerting itself may be accomplished using any of the communication devices controlled by the unified messaging system (e.g., pager, telephone at a designated number, voice mail in a designated voice mail box, facsimile at a designated facsimile number, e-mail at a designated e-mail address, and the like). In accordance with one particularly advantageous embodiment, the message alert is sent to a pager via outgoing pager sub-server 206 since it is the device most likely to be near the subscriber. In one embodiment, the server that sends the alert (e.g., the web server if the incoming message is an e-mail, the telephony server if the incoming message is a facsimile or telephone call) may send out a predefined alphanumeric code that identifies the type of incoming message. The alphanumeric code itself may be predefined either by the unified messaging system or by the subscriber if customization is desired. Preferably, the alert is sent to the subscriber's own number to alert the subscriber that an incoming message fitting the filtering criteria has been received at the unified messaging system.

A facsimile receiving service 319 allows the user to receive facsimile at the unified messaging system if someone sends a facsimile to the subscriber's telephone number. FIG. 4 shows the communication options associated with the facsimile receiving service in greater detail. If the facsimile receiving option is enabled, telephony server 126 will monitor for the facsimile tone and process the incoming message as a facsimile if the facsimile tone is detected. In one embodiment, the incoming facsimile is stored as a GIF or TIFF file that may be viewed by the subscriber through a web page by clicking on facsimile mail link 320. If the facsimile forward option 406 is also enabled, the facsimile will also be forwarded by the outgoing facsimile server 204 to another facsimile machine at specified facsimile number 408, additionally or alternatively to storing a copy of the received facsimile at the unified messaging service. If the facsimile option is not enabled but the call forwarding option is enabled, the call is forwarded on and may be picked up by the forwarded device (if it is a functioning facsimile machine). If not, the incoming facsimile will not be received.

A paging service 321 allows a message sent to the subscriber to be rerouted to a pager designated by the subscriber. Paging service 321 is preferably an on-demand service and allows the caller, if desired, to send a short message to a pager designated by the subscriber. The pager number designated by the subscriber may be designated at location 404a (the paging service number) and, if required, using location 404b (the PIN number for the pager). If the paging service is enabled, a caller to the subscriber's telephone number will be given an option to send a short message to the pager subscriber pager (for example, by pressing a predefined key to send the short message). As noted before, the caller may also choose any of the other services follow me service 308 and/or alternate number 312 if enabled. In this manner, a single telephone number may serve as the access point to receive a page, a voice message, a facsimile, etc.

For alphanumeric pagers with an email address, the outgoing page server may use text to describe the alert message (e.g., "you have a urgent voicemail from caller ID 4152222222 with return number 4153333333") instead of codes as in the case of numeric pagers. The outgoing pager server can then delegate the alert messages to the outgoing email server.

Voice mail messages that are stored may be listened to using either the computer (through an appropriate software/ sound card) by clicking on voice mail link 330 (FIG. 3) or a telephone coupled to the telephony-centric network. E-mails that are sent to the subscriber using the subscriber's e-mail address may be read on-line by, for example, clicking on e-mail link 332 (FIG. 3). In one embodiment, telephone server 126 may be equipped with a text-to-speech facility to allow the subscriber to listen to the content of the e-mail message through a telephone. FIG. 3 also shows an outgoing e-mail link 334, which links the subscriber to an e-mail application program to allow the subscriber to compose and send out e-mail messages. In the case of replying an email via phone, a voice recording may be taken and sent as an email attachment.

As can be appreciated from the above examples, computer-implemented control center 302 provides a central visual interface that allows a subscriber to efficiently review and/or modify the communication option settings associated with the various communication services offered. This is in sharp contrast with time-consuming and burdensome prior art approaches whereby the person is required to contact different entities and deal with different accounts to change the communication options associated with different communication services.

In one embodiment, the computer-implemented control center has two views:

the minimized view and the full view. In the minimized view (e.g., FIG. 3 in one embodiment), the computer-implemented control center may simply show the simplified routing details and the on-off settings associated with the communication options. Although the user may make changes to the on-off settings, fuller edit capabilities are preferably provided in the full view. In the full view (e.g., FIG. 4 in one embodiment), the computer-implemented control center additionally add explanations and detailed routing choices. If desired, an authentication procedure may be implemented with either the minimized view or the full view to ensure that the person making editing changes to the communication options is properly authorized.

It should be appreciated that the communication services and options discussed in connection with FIGS. 3 and 4 are only illustrative of the capabilities of the inventive computer-implemented control center. It should be apparent to those skilled in the art that the same control panel may be presented to the subscriber through the telephony server and the telephone interface if the subscriber wishes to review and/or change the communication options using a telephone connected to the telephony-centric network. The communication options may be presented in a sound format and the subscriber may be offered an option menu to review and/or change any communication option setting. Further, it should also be apparent to those skilled in the art that communication services options other than the preferred and discussed communication services and options can readily be controlled by the inventive computer-implemented control center. Irrespective of the services and options involved, a subscriber can access the centralized computer-implemented control center through either a computer connected to the data-centric network or a telephone connected to the telephony-centric network to review and/or change the communication options.

Figure 5:
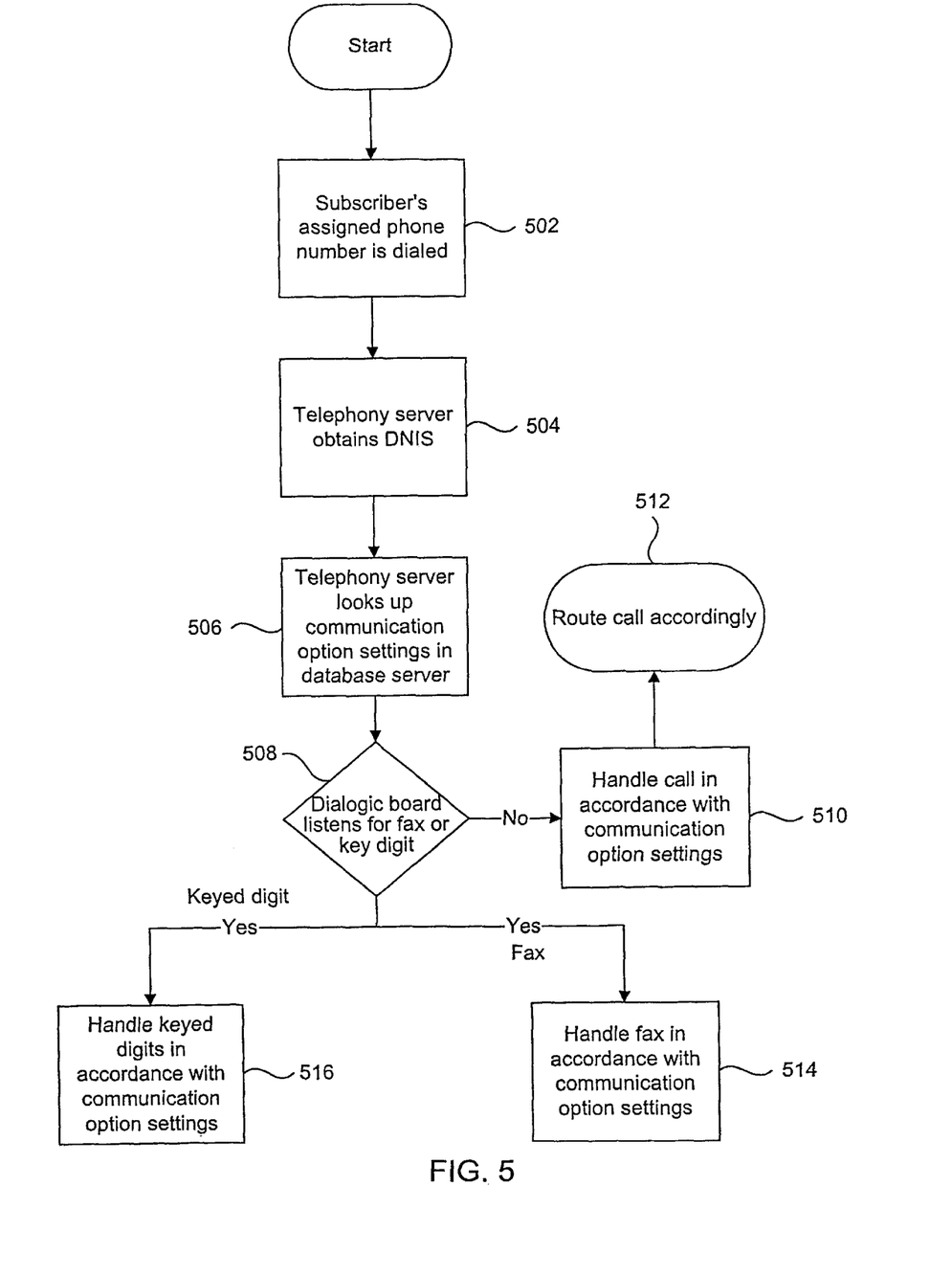
FIG. 5 is a flow diagram depicting, in one embodiment, the relevant steps of a computer-implemented process for handling access to the unified messaging system through the telephony-centric network by a subscribing or a non-subscribing caller.

FIG. 5 is a flow diagram depicting, in one embodiment, the relevant steps of a computer-implemented process for handling access to the unified messaging system through the telephony-centric network by a subscribing or a non-subscribing caller. The subscriber may wish to access the unified messaging system to, for example, listen to stored voice mail messages or e-mail messages, to use the unified messaging system as a calling card service, or to review and/or modify the communication options. A non-subscribing caller may access the unified messaging system to, for example, send a facsimile, a page, or to call the subscriber. The first step 502 involves accessing the unified message system through a telephone using the subscriber's assigned telephone number. A set of two numbers may be assigned to a user, a local telephone number and a toll-free telephone number, both of which may be associated with a single user account.

The dialed digits reaches telephony server 126 via telephone link 128. Telephony server 126 then obtains the DNIS (direct number information service) by digitizing the dialed digits (step 504) and employs the dialed digits to obtain the communication option settings associated with the account represented by the dialed telephone number (step 506). As mentioned earlier, these communication option settings reside in the subscriber communication profile database, which may be managed by database server 120, in one embodiment. During this time, telephone server 126, through an appropriate interface board such as the aforementioned Dialogic board, monitors the incoming line for a facsimile tone or telephone key digit tone.

If no such facsimile tone or telephone key digit tone is detected (step 508), the call is assumed to be a normal call to the subscriber and will be handled (in steps 510 and 512) in accordance with the communication option settings in the manner discussed earlier (e.g., forwarded if call forwarding is on, routed to an alternate number if the caller selects that option and alternate service is enabled, and the like).

On the other hand, if a facsimile tone is detected by telephony server 126, the call will be handled as an incoming facsimile in accordance with the communication option settings (step 514). By way of example, if the facsimile receiving service is enabled, a copy of the facsimile will be stored for later retrieval by the subscriber. If the facsimile forwarding option is enabled, a copy of the facsimile is alternatively or additionally sent to the forwarded facsimile number.

On the other hand, if a keyed digit tone is detected by telephony server 126, software within telephony server will handle the options chosen by the caller (step 516). By way of example, one option may represent the subscriber wishing to access the computer-implemented control center (via an appropriate key press) to review and/or chance the communication options. In this case, telephony server 126 preferably serves up the account statistics, e.g., how many voice mail messages, facsimiles, e-mail messages, etc. are waiting and asks the caller for authentication as a subscriber. If there are none, the subscriber may wish to quickly hang up and not go through the authentication procedure (and extending the cost of the call). This, however, is an option and may be eliminated if privacy is a concern (that is, authentication may take place before the presentation of account statistics).

Telephony server 126 may then obtain the authentication data from the caller (e.g., the password) and compare it with the subscriber account authentication data, which it obtains from the subscriber communication profile database in the database server. Authentication may be done via keyed digit entry or, in one embodiment, by voice commands, which may then be translated to keyed digits by appropriate software. If authenticated, the subscriber may then be presented with a menu that allows the subscriber to review and/or change the communication options via key press or voice commands. Once the subscriber saves the changes, the changed communication option settings will be employed to handle future messages transmitted and/or received through either the telephony-centric network or the data-centric network.

As one of the options, the subscriber may be given a choice (with proper authentication) to use the unified messaging system to originate an outgoing call. The choice may be made via, for example, a predefined key press or voice command. This is useful in situations wherein the subscriber accesses his account at the unified messaging system through his toll-free number (e.g., from the airport or from someone else's telephone) and instructs the telephony server to connect his incoming call to an outgoing call to a provided destination telephone number and charges the cost to his account. In this manner, the unified messaging system may be employed as a convenient calling card.

A keyed digit may also represent an on-demand service selection chosen by the caller. In this case, the caller simply presses an appropriate key when prompted and employs one of the on-demand services is then employed to handle his call. Various on-demand services have been discussed in connection with FIGS. 3 and 4 and will not be repeated here for the sake of brevity.

Figure 6:
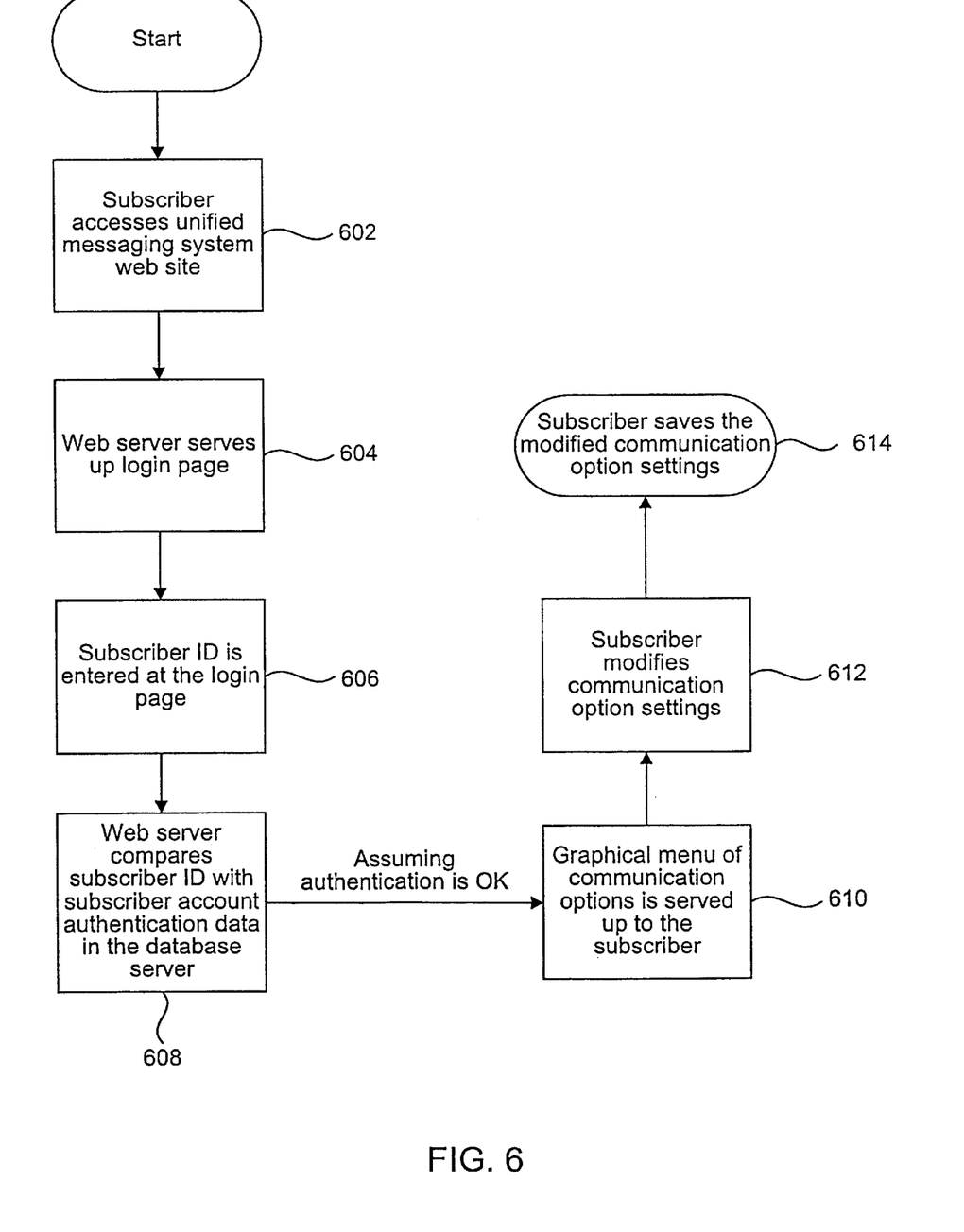
FIG. 6 is a flow diagram depicting, in one embodiment, the relevant steps of a computer implemented process for handling access to the unified messaging system through a computer network by a subscriber.

FIG. 6 is a flow diagram depicting, in one embodiment, the relevant steps of a computer implemented process for handling access to the unified messaging system by a subscriber through a data-centric network (such as the Internet in the example of FIG. 6). The subscriber may wish to access the unified messaging system to, for example, listen to stored voice mail messages, view stored e-mail messages or facsimiles, send e-mail messages or facsimiles, or to review and/or modify the communication options. The first step 602 involves accessing the unified messaging system web site, using a unified messaging system web address (e.g., "unifiedmessagingsystem.com"), with user computer 100 through a data-centric network 102.

The web site request connects to the web server 122 via data link 104 and network interface system 105. Following connection to the web site, the unified messaging system web server 122 serves up a login page using, for example, ASP-active server pages (step 604). The next step (step 606) includes entering authentication data such as a subscriber identifier (ID), e.g., username and password, at the login page. The web server 122, after obtaining the authentication data, compares it with the subscriber account authentication data (step 608), which it obtains from the subscriber communication profile database from the database server. If authenticated, the subscriber may then be presented with a graphical menu of the communication options (step 610) that allows the subscriber to retrieve his email/voicemail/fax messages, or review and/or modify the communication options via user computer 100 (step 612). Once the subscriber saves the changes (step 614), the modified communication option settings will be employed to handle future messages transmitted and/or received through either the telephony-centric network or the data-centric network.

Accordingly, the present invention provides a single centralized facility that gives a subscriber of various communication services (e.g., telephone, facsimile, pager, e-mail) the ability to review and modify his communication options (e.g., call forwarding, follow me service, alternate number, message alert, facsimile receiving, paging, routings and the like). This review and modification is done in an interactive and simplified manner, via either the data-centric network or the telephony-centric network.

The unified messaging system benefits a subscriber by integrating various communication services which up to now have existed as separate services. This is in sharp contrast to the prior art where the dual existence of the data-centric network and the telephony-centric network has forced the service providers to manage communication options as separate accounts.

This integration simplifies management, billing, and more importantly the routing of messages among the various services. The unified messaging system gives the subscriber more control with regards to how the world communicates to the subscriber. For example, a subscriber may specify that an incoming facsimile be forwarded to a computer for viewing or to a printer for printing, listen to e-mail messages through a telephone, receive pager notification when a facsimile is received, etc. The unified messaging system allows messages to be received, stored, retrieved, and/or forwarded without regard to the communication devices and/or networks employed for the transmission of the messages. In fact, the unified messaging system even gives non-subscribers choices with its on-demand services associated with some of the communication options.

The unified messaging system advantageously removes the burden of managing different physical devices and different accounts. The subscriber no longer has to access multiple accounts to modify options. As mentioned previously, a person who travels may wish to forward calls made from his home and office telephone numbers to his cellular telephone or hotel telephone. Likewise, he may wish to divert facsimiles sent to an office facsimile machine to a facsimile machine that is more local. While in a meeting, however, one may wish to temporarily divert the voice calls to a voice mail box or forwards it to another person for handling. To stay in touch, these communication options may need to be changed many times during the course of the day and/or each time one arrives at a new location.

Using the present invention, a person need only access the unified messaging system either with a telephone or a computer. The communication options may then be modified as needed with a few key strokes. The subscriber has the ability to review communication options at a single facility and no longer has to recall communication options from memory or contact each service provider.

Furthermore, the present invention advantageously allows remote access to the unified messaging system from any location that is connected to the data-centric network or the telephony-centric network. The subscriber no longer has to be physically present at the forwarding origin to modify the forwarding option. This advantage leads to yet another advantage in that the unified messaging system may be used as a calling card. The subscriber if located at the airport, for example, contacts his unified messaging system toll-free telephone number. The system then allows the subscriber the option of rerouting this call to another location.

Also, the present invention advantageously allows the subscriber the convenience of one telephone number (or two, including a toll-free 800 number). Multiple number confusion is avoided by connecting multiple numbers through the one number of the unified messaging system.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for permitting a subscriber of a plurality of communication services of a unified messaging system to customize communication options pertaining to said plurality of communication services, said communication options include parameters associated with individual ones of said plurality of said communication services and routings among said plurality of communication services, said plurality of communication services comprising a voice telephone service through a telephony-centric network and an e-mail service through a data-centric network, said communication options being accessible via display terminals coupled to said data-centric network and via telephones coupled to said telephony-centric network, said method comprising:

providing a subscriber communication profile database, said subscriber communication profile database having therein an account pertaining to said subscriber, said account including said communication options for said subscriber;

generating a single graphical menu for displaying said communication options for each of said communication services at the same time, wherein said single graphical menu comprises at least a first display area for showing a first communication service and a first communication option associated with said first communication service, and a second display area for showing a second communication service and a second communication option associated with said second communication service, the first display area and the second display area being displayed at the same time in said single graphical menu, and wherein the first communication option included a first enable option for enabling or disabling the first communication service, and wherein the second communication option includes a second enable option for enabling or disabling the second communication service;

visually displaying said single graphical menu on one of said display terminals, using a computer server coupled to exchange data with said subscriber communication profile database, when said subscriber employs said one of said display terminals to access said computer-implemented control center;

providing a telephony server coupled to exchange data with said communication profile database;

audibly representing said communication options to one of said telephones, using said telephony server, when said subscriber employs said one of said telephones to access said computer-implemented control center;

receiving from said subscriber via said one of said display terminals at said computer server a first change to at least one of said communication options, said first change to said communication options pertains to either said voice telephone service or said e-mail service; and updating said first change to said account in said subscriber communication profile database, thereby resulting in a first updated subscriber communication profile database, wherein subsequent messages to said subscriber at said unified messaging system, including said voice telephone service, are handled in accordance with said first updated subscriber communication profile database.

2. The computer-implemented method of claim 1 further comprising:

receiving at said telephony server from said subscriber via said one of said telephones a second change to at least one of said communication options; and updating said second change to said account in said subscriber communication profile database, thereby resulting in a second updated subscriber communication profile database, wherein subsequent messages to said subscriber at said unified messaging system, including said e-mail service are handled in accordance with said updated subscriber communication profile database.

3. The computer-implemented method of claim 2 wherein said facsimile and said voice telephone service are both implemented using a single telephone number.

4. The computer-implemented method of claim 1 wherein said plurality of communication set-vices include a facsimile service configured to permit said subscriber to receive at said unified messaging system a facsimile through said telephony-centric network and said telephony server, said communication options including a facsimile receiving enable option associated with said facsimile service.

5. The computer-implemented method of claim 1 further comprising:

providing a pager server coupled to exchange data with said communication profile database, wherein said communication services further include a pager alert service and wherein said communication options further include a pager alert option, said pager server being configured to transmit, when said pager alert option is enabled, an alert to a pager through said telephony-centric network if an e-mail message is received by said subscriber through said data-centric network, said pager having a page number that is also specified as part of said pager alert option.

6. The computer-implemented method of claim 1 wherein said plurality of communication services include a call forwarding service configured to permit said subscriber to specify whether a call received at a telephone number associated with said account be forwarded to a forwarding telephone number, said communication options including a call forwarding enable option and said forwarding telephone number.

7. The computer-implemented method of claim 1 wherein said plurality of communication services include an alternate number service, said communication options including an alternate number service enable option associated with said alternate number service and an alternate telephone number, said alternate number service enable option, when enabled by said subscriber, permits a caller to said subscriber at said unified messaging system to elect to forward a call by said caller to an alternate telephone associated with said alternate telephone number.

8. The computer-implemented method of claim 1 wherein said plurality of communication services include a follow-me service, said communication options including a follow-me service enable option associated with said follow-me service and a set of telephone numbers, said follow-me service enable option when enabled by said subscriber, permits a caller to said subscriber at said unified messaging system to elect to forward a call by said caller to a telephone associated with said set of telephone numbers.

9. The computer-implemented method of claim 8 wherein said follow-me service is configured to ring in sequence each one of said telephones associated with said set of telephone numbers until said call by said caller is accepted.

10. The computer-implemented method of claim 9 wherein said follow-me service is configured to ring first a last-found telephone number, said last-found telephone number representing a telephone number associated with a phone previously employed by said subscriber to answer an immediately preceding call to said subscriber.

11. The computer-implemented method of claim 8 wherein said single graphical menu comprises at least:

a first display area for showing said on-demand communication service, said on-demand communication enable option, and said forwarding number.

12. The computer-implemented method of claim 11 wherein said single graphical menu further comprises:

a second display area for showing a second communication service, and a second communication option associated with said second communication service, the first display area and the second display area being displayed at the same time in said single graphical menu.

13. The computer-implemented method of claim 12 wherein said on-demand communication service is selected from a follow-me service, an alternate number service, and a paging service, and wherein said second communication service is selected from a call forwarding service, a follow-me service, an alternate number service, a message alert service, a fax receiving service, and a paging service.

14. The computer-implemented method of claim 12 wherein the second communication option includes a second enable option for enabling or disabling the second communication service.

15. The computer-implemented method of claim 14 wherein the second communication option includes a routing option.

16. The computer-implemented method of claim 15 wherein the forwarding number includes a plurality of numbers, and wherein the second routing option includes a plurality of routings.

17. A data structure for permitting a subscriber of a plurality of communication services of a unified messaging system to customize communication options pertaining to said plurality of communication services, said communication options include parameters associated with individual ones of said plurality of said communication services and routings among said plurality of communication services, said plurality of communication services comprising a voice telephone service through a telephony-centric network and an e-mail service through a data-centric network, said communication options being accessible via display terminals coupled to said data-centric network and via telephones coupled to said telephony-centric network, said data structure for use with:

a subscriber communication profile database, said subscriber communication profile database having therein an account pertaining to said subscriber, said account including said communication options for said subscriber; said data structure comprising:

a single graphical menu for displaying said communication options for each of said communication services at the name time, wherein said single graphical menu comprises at least a first display area for showing a first communication service and a first communication option associated with said first communication service, and a second display area for showing a second communication service and a second communication option associated with said second communication service, the first display area and the second display area being displayed at the same time in said single graphical menu, and wherein the first communication option includes a first enable option for enabling or disabling the first communication service, and wherein the second communication option includes a second enable option for enabling or disabling the second communication service;

said single graphical menu capable of being displayed on one of said display terminals using a computer server coupled to exchange data with said subscriber communication profile database, when said subscriber employs said one of said display terminals to access said computer-implemented control center;

wherein a telephony server is coupled to exchange data with said communication profile database;

an audible representation of said communication options capable of being provided to one of said telephones, using said telephony server, when said subscriber employs said one of said telephones to access said computer-implemented control center;

a first change to at least one of said communication options received from said subscriber via said one of said display terminals at said computer server, said first change to said communication options pertaining to either said voice telephone service or said e-mail service;

wherein said first change is updated to said account in said subscriber communication profile database, thereby resulting in a first updated subscriber communication profile database, and wherein subsequent messages to said subscriber at said unified massaging system, including said voice telephone service, are handled in accordance with said first updated subscriber communication profile database.

18. A computer readable media including instructions for a computer-implemented method for permitting a subscriber of a plurality of communication services of a unified messaging system to customize communication options pertaining to said plurality of communication services, said communication options include parameters associated with individual ones of said plurality of said communication services and routings among said plurality of communication services, said plurality of communication services comprising a voice telephone service through a telephony-centric network and an e-mail service through a data-centric network, said communication options being accessible via display terminals coupled to said data-centric network and via telephones coupled to said telephony-centric network, said instructions comprising;

providing a subscriber communication profile database, said subscriber communication profile database having therein an account pertaining to said subscriber, said account including said communication options for said subscriber;

generating a single graphical menu for displaying said communication options for each of said communication services at the same time, wherein said single graphical menu comprises at least a first display area for showing a first communication service and a first communication option associated with said first communication service, and a second display area for showing a second communication service and a second communication option associated with said second communication service, the first display area and the second display area being displayed at the same time in said single graphical menu, and wherein the first communication option includes a first enable option for enabling or disabling the first communication service, and wherein the second communication option includes a second enable option for enabling or disabling the second communication service;

visually displaying said single graphical menu on one of said display terminals, using a computer server coupled to exchange data with said subscriber communication profile database, when said subscriber employs said one of said display terminals to access said computer-implemented control center;

providing a telephony server coupled to exchange data with said communication profile database;

audibly representing said communication options to one of said telephones, using said telephony eerier, when said subscriber employs said one of said telephones to access said computer-implemented control center;

receiving from said subscriber via said one of said display terminals at said computer server a first change to at least one of said communication options, said first change to said communication options pertains to either said voice telephone service or said e-mail service; and updating said first change to said account in said subscriber communication profile database, thereby resulting in a first updated subscriber communication profile database, wherein subsequent messages to said subscriber at said unified messaging system, including said voice telephone service, are handled in accordance with said first updated subscriber communication profile database.

* * * * *

UNITED STATES PATENT AND TRADEMARK OFFICE
CERTIFICATE OF CORRECTION

PATENT NO. : 6,728,357 B2
DATED : April 27, 2004
INVENTOR(S) : Stephen O'Neal

Page 1 of 1

It is certified that error appears in the above-identified patent and that said Letters Patent is hereby corrected as shown below:

Column 1,
Line 15, delete "6,411,695" and insert -- 6,411,685 --.

Column 15,
Line 58, delete "chance" and insert -- change --.

Column 19,
Line 24, delete "set-vices" and insert -- services --.

Column 20,
Line 65, delete "name" and insert -- same --.

Column 22,
Line 36, delete "eerier" and insert -- server --.

Signed and Sealed this

Twenty-eighth Day of June, 2005

JON W. DUDAS
*Director of the United States Patent and Trademark Office*